United States Patent [19]

Togino et al.

[11] Patent Number: 5,654,828
[45] Date of Patent: Aug. 5, 1997

[54] OPTICAL SYSTEM AND VISUAL DISPLAY APPARATUS

[75] Inventors: Takayoshi Togino, Koganei; Kunie Nakagiri, Komagane, both of Japan

[73] Assignee: Olympus Optical Co., Ltd., Tokyo, Japan

[21] Appl. No.: 540,088

[22] Filed: Oct. 6, 1995

[30] Foreign Application Priority Data

Oct. 7, 1994 [JP] Japan .................. 6-244053

[51] Int. Cl.$^6$ ........................ G02B 27/14
[52] U.S. Cl. .................. 359/633; 359/631
[58] Field of Search ............... 359/633, 631, 359/850, 636

[56] References Cited

U.S. PATENT DOCUMENTS

| Re. 27,356 | 5/1972 | La Russa. | |
|---|---|---|---|
| 4,653,875 | 3/1987 | Hines | 359/631 |
| 5,050,966 | 9/1991 | Berman | 359/38 |
| 5,506,728 | 4/1996 | Edwards | 359/629 |
| 5,517,366 | 5/1996 | Togino | 350/850 |
| 5,589,979 | 12/1996 | Martin | 359/449 |

*Primary Examiner*—Georgia Y. Epps
*Assistant Examiner*—Ricky Mack
*Attorney, Agent, or Firm*—Cushman Darby & Cushman IP Group of Pillsbury Madison & Sutro LLP

[57] ABSTRACT

An optical system which is usable as either an ocular optical system or an imaging optical system, and which is satisfactorily corrected for both field curvature and comatic aberration for a field angle of up to about 120° and for a pupil diameter of up to about 15 millimeters. The optical system includes a partial optical system (10) having a flat semi-transparent surface (1) which is closer to a pupil plane (E), and a concave semitransparent surface (2) which is closer to an image plane (I). A refracting optical element (4) is disposed at the pupil plane (E) or image plane (I) side of the partial optical system (10) with an air spacing provided therebetween. Alternatively, the refracting optical element (4) may be cemented to the partial optical system (10). The refracting optical element (4) has a focal length $f_a$ which satisfies the condition of $f_a > 0$.

11 Claims, 10 Drawing Sheets

42 Aluminum coating
41 Substrate (glass)

41 Substrate (glass)
43 Semitransparent thin film

41 Substrate (glass)
44 Polarizing semi-transparent thin film

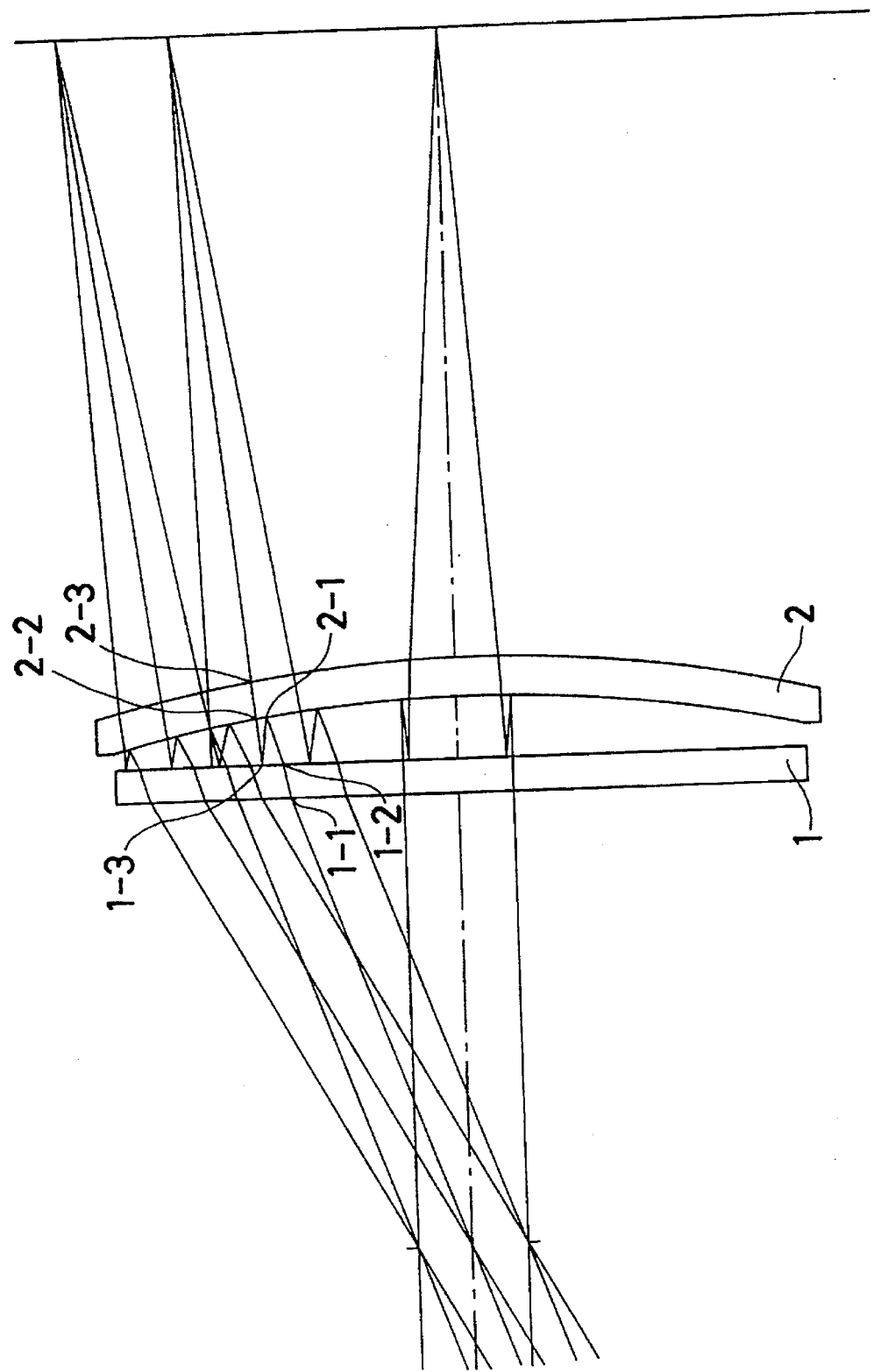

OPTICAL SYSTEM AND VISUAL DISPLAY APPARATUS

BACKGROUND OF THE INVENTION

The present invention relates to an optical system and a visual display apparatus. More particularly, the present invention relates to an optical system which is usable as either an ocular optical system or an imaging optical system, and which provides high resolution with minimal field curvature and comatic aberration even when the field angle is wide and the pupil diameter is large. The present invention also relates to a visual display apparatus which uses such an optical system.

A Schmidt system, which is well known as an objective for astronomical telescopes, is generally arranged such that an aspherical lens which is close to a plane-parallel plate is placed at the spherical center of a concave mirror to correct spherical aberration, and a diaphragm is disposed at the spherical center to correct coma and astigmatism. Concentric optical systems, which are represented by the Schmidt system, are free from coma and astigmatism by virtue of the diaphragm disposed in the vicinity of the center of curvature of the concave mirror. However, since the curvature of field cannot be corrected, a large field curvature occurs.

U.S. Reissued Pat. No. 27,356 discloses an ocular optical system which uses a semitransparent concave mirror and a semitransparent plane mirror, each as a single independent constituent element, to project an object surface in a distance. However, since the semitransparent concave mirror and the semitransparent plane mirror are each formed from a single independent constituent element, when the field angle and the pupil diameter are enlarged, off-axis aberrations such as field curvature, coma, etc. are likely to occur.

The causes of field curvature and comatic aberration in the optical system of U.S. Reissued Pat. No. 27,356 will be explained below with reference to FIG. 19. In the figure, the semitransparent plane mirror is denoted by reference numeral 1, and the semitransparent concave mirror is denoted by reference numeral 2. As shown in the figure, a bundle of light rays passes through or is reflected by each surface in the sequence: 1-1, 1-2, 2-1, 1-3, 2-2, and 2-3. At the surfaces 1-1, 1-2, 2-2 and 2-3, the ray bundle is subjected to refracting action; at the surfaces 2-1 and 1-3, the ray bundle is subjected to reflecting action. Since no optical element having power is disposed in front of the semitransparent plane mirror 1, neither field curvature nor comatic aberration is produced by the refracting action of the semitransparent plane mirror 1. Further, since the semitransparent plane mirror 1 is an optical element having no power, neither field curvature nor comatic aberration is produced by the reflecting action of the surface 1-3. Since each surface of the semi-transparent concave mirror 2 has power, both field curvature and comatic aberration are produced by the reflecting action of the surface 2-1 and the refracting action of the surfaces 2-2 and 2-3. However, since the semitransparent concave mirror 2 is a meniscus lens whose surfaces have the same power, the surfaces 2-2 and 2-3 produce field curvatures which are opposite in sign but approximately equal in quantity to each other, and also produce comatic aberrations which are opposite in sign but approximately equal in quantity to each other. Accordingly, the field curvatures cancel each other, and so do the comatic aberrations. Therefore, the surfaces 2-2 and 2-3 do not contribute to the occurrence of field curvature and comatic aberration at the image plane. In other words, the main causes of field curvature and comatic aberration at the image plane are positive field curvature and positive comatic aberration produced by the reflecting action at the surface 2-1.

As the field angle increases, the power of each surface of the semitransparent concave mirror 2 also becomes stronger, resulting in an increase of the amount of positive field curvature produced at the surface 2-1. As the pupil diameter increases, the difference in incident angle between extra-axial upper and lower marginal rays at the surface 2-1 increases, resulting in an increase of the amount of positive comatic aberration produced.

As has been described above, it is difficult for an optical system consisting of a semitransparent plane mirror and a semitransparent concave mirror to correct both field curvature and comatic aberration satisfactorily, and hence difficult to cope with the demand for achievement of a wide field angle and a large pupil diameter.

SUMMARY OF THE INVENTION

In view of the above-described problems of the prior art, an object of the present invention is to provide an optical system which is usable as either an ocular optical system or an imaging optical system, and which is satisfactorily corrected for both field curvature and comatic aberration for a field angle of up to about 120° and for a pupil diameter of up to about 15 millimeters.

Another object of the present invention is to provide a visual display apparatus which uses the above-described optical system.

To attain the first object, the present invention provides an optical system including a partial optical system having at least two semitransparent surfaces which are disposed so that each semitransparent surface transmits light rays at least once and reflects them at least once, and a refracting optical element having power.

In this case, the partial optical system may be arranged such that the semitransparent surface which is closer to the pupil plane is a flat surface, whereas the semitransparent surface which is closer to the image plane is a concave surface. The refracting optical element may be disposed at the pupil plane or image plane side of the partial optical system with an air spacing provided therebetween. Further, it is preferable to satisfy the following condition:

$$f_a > 0 \qquad (1)$$

where $f_a$ is the focal length of the refracting optical element.

Further, the refracting optical element having power may be cemented to the pupil plane or image plane side of the partial optical system. In this case, it is preferable to satisfy the following condition:

$$0.1 < f_2/f_a < 3 \qquad (8)$$

where $f_a$ is the focal length of the refracting optical element, and $f_2$ is the focal length of the partial optical system.

The present invention has been accomplished in view of the above-described problems of the prior art. In the basic arrangement of the present invention, the optical system includes a partial optical system having at least two semitransparent surfaces which are disposed so that each semitransparent surface transmits light rays at least once and reflects them at least once. In addition, the optical system includes at least one refracting optical element. With this arrangement, the present invention has succeeded in correcting both field curvature and comatic aberration with good balance and thereby obtaining an image plane of high resolution even when the field angle is wide and the pupil diameter is large.

The optical system of the present invention will be explained below as an imaging optical system for the sake of convenience. However, it will be obvious that the optical system can be used as an ocular optical system by modifying the arrangement such that the image plane in the optical system of the present invention formed as an imaging optical system is replaced by an object point. Thus, it will be obvious that the optical system of the present invention can also function as an ocular optical system by inverting the arrangement of the imaging optical system described below. Further, in the following description of the present invention, symbols used for field curvature and comatic aberration are defined in accordance with Yoshisada Hayami "Optics of Optical Apparatus I" (Optomechatronics Association).

The field curvature and comatic aberration correcting method according to the present invention will be explained below in the following order: That is, the method of correcting field curvature and comatic aberration in an optical system comprising a semitransparent plane mirror and a semitransparent curved mirror will be explained with regard to (1) a case where a refracting optical element having power is disposed at the pupil plane or image plane side of the partial optical system without being cemented to it; and (2) a case where a refracting optical element having power is cemented to the pupil plane or image plane side of the partial optical system.

First, the field curvature and comatic aberration correcting method for (1) will be explained with reference to FIGS. 1 and 2.

FIG. 1 shows an example in which a refracting optical element 4 having positive power is disposed at a position closer to a pupil plane E. A semitransparent plane mirror 1 and a semitransparent concave mirror 2 constitute a partial optical system 10. The semitransparent concave mirror 2 has a reflective surface 3. A refractive surface of the refracting optical element 4 which is closer to the pupil plane E is denoted by reference numeral 5, and a refractive surface of the refracting optical element 4 which is closer to an image plane I is denoted by reference numeral 6.

FIG. 2 shows an example in which a refracting optical element 4 having positive power is disposed at a position closer to the image plane I. In this case also, a semitransparent plane mirror 1 and a semitransparent concave mirror 2 constitute a partial optical system 10. The semitransparent concave mirror 2 has a reflective surface 3. A refractive surface of the refracting optical element 4 which is closer to the pupil plane E is denoted by reference numeral 5, and a refractive surface of the refracting optical element 4 which is closer to the image plane I is denoted by reference numeral 6.

In order to correct field curvature, a refracting optical element which produces negative field curvature must be provided in the optical system so as to cancel positive field curvature produced by the reflective surface 3 in FIGS. 1 and 2. Usually, a convex lens having positive power produces negative field curvature, whereas a concave lens having negative power produces positive field curvature. Therefore, to cancel the positive field curvature, a convex lens having positive power should be disposed at the pupil plane (E) or image plane (I) side of the partial optical system 10, which comprises the semitransparent plane mirror 1 and the semitransparent concave mirror 2.

That is, it is important to satisfy the following condition:

$$f_a > 0 \quad (1)$$

where $f_a$ is the focal length of the refracting optical element 4 having power, which is disposed at the pupil plane (E) or image plane (I) side of the partial optical system 10.

To correct not only field curvature but also comatic aberration with good balance, it is even more desirable to take into consideration the configuration of the refracting optical element 4. First, the configuration of the refracting optical element 4 when disposed at the pupil plane side (E) of the partial optical system 10 will be explained.

If both the refractive surfaces 5 and 6 of the refracting optical element 4 are convex surfaces, negative field curvature is produced by each of the refractive surfaces 5 and 6. However, if the refractive surface 5 is made convex so as to cancel the positive field curvature produced by the reflective surface 3, the incident angles of extra-axial upper and lower marginal rays at the refractive surface 5 differ from each other to a considerable extent. Accordingly, the amount of negative comatic aberration produced by the refractive surface 5 is likely to exceed the amount of positive comatic aberration produced by the reflective surface 3. Therefore, it is important to weaken the power of the refractive surface 5 so as to suppress the occurrence of excess negative comatic aberration. If the power of the refractive surface 5 is made extremely weak, substantially no off-axis aberration is produced, and the bundle of extra-axial rays is subjected to strong refracting action. The extra-axial ray bundle refracted by the refractive surface 5 makes a small angle to the optical axis at the refractive surface 6. Accordingly, it is possible for the refracting optical element 4 to have a convex surface which produces negative field curvature without producing excess negative comatic aberration.

Next, the configuration of the refracting optical element 4 in a case where it is disposed at the image plane (I) side of the partial optical system 10 will be explained.

Even if the extra-axial ray bundle forms a large angle relative to the optical axis at the pupil plane E, after it has passed through the partial optical system 10, which comprises the semitransparent plane mirror 1 and the semitransparent concave mirror 2, the angle between the extra-axial ray bundle and the optical axis has become small. Therefore, even if the refractive surfaces 5 and 6 of the refracting optical element 4 are made convex so as to cancel positive field curvature produced by the reflective surface 3, it may be difficult to produce sufficiently large negative comatic aberration by the refractive surfaces 5 and 6 so as to cancel large positive comatic aberration produced by the reflective surface 3. Therefore, the pupil plane (E) side refractive surface 5 of the refracting optical element 4, on which the extra-axial ray bundle is incident at a relatively large angle, is preferably given a convex configuration having stronger power than the image plane (I) side surface 6 of the refracting optical element 4, thereby enabling relatively large negative comatic aberration to be readily produced, and thus simultaneously canceling large positive field curvature and positive comatic aberration produced by the reflective surface 3.

In other words, it is important to satisfy the following condition:

$$1/R_1 > 1/R_2 \quad (2)$$

where $R_1$ is the curvature radius of the pupil plane (E) side surface 5 of the refracting optical element 4 of positive power, which is disposed at the pupil plane (E) or image plane (I) side of the partial optical system 10, and $R_2$ is the curvature radius of the image plane (I) side surface 6 of the refracting optical element 4.

To obtain an image of higher resolution, it is even more desirable to satisfy the following condition:

$$0.35 < f_2/f_a < 3.4 \tag{3}$$

where $f_a$ is the focal length of the refracting optical element 4 having power, which is disposed at the pupil plane (E) or image plane (I) side of the partial optical system 10 having at least two semitransparent mirrors 1 and 2, and $f_2$ is the focal length of the partial optical system 10.

If the value of $f_2/f_a$ in the condition (3) is not smaller than the upper limit, i.e. 3.4, the power of the refracting optical element 4 becomes excessively stronger than the power of the reflective surface 3 of the semitransparent concave mirror 2, causing negative field curvature and negative comatic aberration to occur on the image plane I. Conversely, if the value of $f_2/f_a$ is not larger than the lower limit of the condition (3), i.e. 0.35, the power of the refracting optical element 4 becomes excessively weaker than the power of the reflective surface 3 of the semitransparent concave mirror 2. Consequently, positive field curvature and positive comatic aberration undesirably remain on the image plane I.

Further, in a case where a convex lens having positive power is disposed at the pupil plane (E) or image plane (I) side of the partial optical system 10, which comprises the semitransparent plane mirror 1 and the semitransparent concave mirror 2, it is even more desirable, with a view to obtaining an optical system having a wider field angle while satisfactorily correcting off-axis aberrations, to dispose refracting optical elements of positive power which satisfy the following conditions (4) and (5) at both the pupil plane (E) and image plane (I) sides, respectively, of the partial optical system 10.

The extra-axial ray bundle, which forms a large angle relative to the optical axis, is subjected to positive refracting action by the refracting optical element of positive power which is disposed at the pupil plane side. Therefore, the angle at which the extra-axial ray bundle enters the partial optical system, which comprises two semitransparent mirrors, becomes small. This allows the semitransparent concave mirror to reduce in power, and suppresses the occurrence of off-axis aberrations. However, when the field angle is particularly wide, the incident angle of the extra-axial ray bundle when it is first reflected by the semitransparent concave mirror inevitably increases. Therefore, it is likely that off-axis aberrations will be aggravated.

Accordingly, to prevent the aggravation of off-axis aberrations even in the case of a particularly wide field angle, it is preferable to dispose a refracting optical element having positive power also at the image plane side so as to prevent off-axis aberrations from remaining on the image plane. When two refracting optical elements are to be disposed at both the pupil plane and image plane sides, respectively, it is important to take into consideration the power balance between each refracting optical element and the semitransparent concave mirror, and it is preferable to satisfy the following conditions.

That is, it is important to satisfy the following conditions:

$$0.1 < f_2/f_1 < 1.8 \tag{4}$$

$$0.3 < f_2/f_3 < 2.4 \tag{5}$$

where $f_1$ is the focal length of the pupil plane-side refracting optical element having power, $f_3$ is the focal length of the image plane-side refracting optical element having power, and $f_2$ is the focal length of the partial optical system comprising two semitransparent surfaces.

The upper and lower limits of the above conditions (4) and (5) have been set for the same reasons as stated above for the condition (3).

Further, when refracting optical elements are disposed at both the pupil plane and image plane sides of the partial optical system, positive field curvature and positive comatic aberration which are caused by reflection at the semitransparent concave mirror are canceled by the two refracting optical elements. Therefore, it is not absolutely necessary to satisfy the condition (2).

Next, the field curvature and comatic aberration correcting method for the above case (2), where a refracting optical element having power is cemented to the pupil plane or image plane side of the partial optical system, will be explained with reference to FIGS. 3 and 4.

FIG. 3 shows an example in which a refracting optical element 4 having power is disposed at a position closer to the pupil plane E. A semitransparent plane mirror 1 and a semitransparent concave mirror 2 constitute a partial optical system 10. The semitransparent concave mirror 2 has a reflective surface 3. A refractive surface of the refracting optical element 4 which is closer to the pupil plane E is denoted by reference numeral 5, and a refractive surface of the refracting optical element 4 which is closer to the image plane I is denoted by reference numeral 6.

FIG. 4 shows an example in which a refracting optical element 4 having power is disposed at a position closer to the image plane I. In this case also, a semitransparent plane mirror 1 and a semitransparent concave mirror 2 constitute a partial optical system 10. The semitransparent concave mirror 2 has a reflective surface 3. A refractive surface of the refracting optical element 4 which is closer to the pupil plane E is denoted by reference numeral 5, and a refractive surface of the refracting optical element 4 which is closer to the image plane I is denoted by reference numeral 6.

In order to correct field curvature, a refracting optical element which produces negative field curvature must be provided in the optical system so as to cancel positive field curvature produced by the reflective surface 3 in FIGS. 3 and 4. First, an explanation will be given with regard to a case where the refracting optical element 4 having power is disposed at the pupil plane (E) side of the partial optical system 10. Since the surface 6 of the refracting optical element 4 is cemented to the semitransparent plane mirror 1, it is a flat surface and has no capability of correcting field curvature. Therefore, it is necessary to form the refractive surface 5 of the refracting optical element 4 into a convex surface in order to produce negative field curvature. Since the configuration of the refracting optical element 4 having power, which is cemented to the pupil plane (E) side of the partial optical system 10, is a convex-plane lens, the refracting optical element 4 has positive power. That is, it is important to satisfy the following condition:

$$f_1 > 0 \tag{6}$$

where $f_1$ is the focal length of the refracting optical element 4 having power, which is cemented to the pupil plane (E) side of the partial optical system 10.

Next, an explanation will be given with regard to a case where the refracting optical element 4 having power is disposed at the image plane (I) side of the partial optical system 10. Since the surface 5 of the refracting optical element 4 is cemented to the semitransparent concave mirror 2, the surface 5 and the image plane (I)-side surface of the semitransparent concave mirror 2 have the same curvature radius. Accordingly, the surface 5 does not have very strong capability of correcting off-axis aberrations. For this reason, it is necessary to form the refractive surface 6 into a convex surface in order to produce negative field curvature. The configuration of the refracting optical element 4 having power, which is cemented to the image plane (I) side of the partial optical system 10, is a meniscus lens. The power of the meniscus lens is either positive or negative depending upon the power of the refractive surface 6. As the power of the refractive surface 6 as a convex surface increases, the focal length of the meniscus lens 4 changes from a negative value to a positive value. In order to produce satisfactorily large negative field curvature by the convex refractive surface 6, it is necessary to make the power of the convex refractive surface 6 strong to a certain extent, and it is important for the meniscus lens 4 to have weak negative or positive power. That is, it is important to satisfy the following condition:

$$f/f_3 > -0.12 \tag{7}$$

where f is the focal length of the entire optical system, and $f_3$ is the focal length of the refracting optical element 4 having power, which is cemented to the image plane (I) side of the partial optical system 10.

If the value of $f/f_3$ in the condition (7) is not larger than $-0.12$, the meniscus lens 4 has undesirably strong negative power, so that it becomes impossible to produce sufficiently large negative field curvature by the refractive surface 6.

With a view to satisfactorily correcting off-axis aberrations, i.e. field curvature and comatic aberration, to obtain an image of higher resolution, it is necessary to correct field curvature by the convex surface of the refracting optical element 4, which is disposed at the pupil plane (E) or image plane (I) side of the partial optical system 10, and at the same time, to correct comatic aberration even more effectively with good balance. To meet the requirements, it is preferable to satisfy the following condition:

$$0.1 < f_2/f_a < 3 \tag{8}$$

where $f_a$ is the focal length of the refracting optical element 4 having power, which is disposed at the pupil plane (E) or image plane (I) side of the partial optical system 10 having two semitransparent mirrors 1 and 2, and $f_2$ is the focal length of the partial optical system 10.

If the value of $f_2/f_a$ in the condition (8) is not smaller than the upper limit, i.e. 3, the power of the convex refractive surface 5 shown in FIG. 3 or the power of the convex refractive surface 6 shown in FIG. 4 is excessively stronger than the power of the reflective surface 3 of the semitransparent concave mirror 2. Consequently, excess negative field curvature and negative comatic aberration occur on the image plane I. Conversely, if the value of $f_2/f_a$ in the condition (8) is not larger than the lower limit, i.e. 0.1, the power of the convex refractive surface 5 shown in FIG. 3 or the power of the convex refractive surface 6 shown in FIG. 4 is excessively weaker than the power of the reflective surface 3 of the semitransparent concave mirror 2. Consequently, positive field curvature and positive comatic aberration undesirably remain on the image plane I.

To obtain an optical system with a wider field angle while satisfactorily correcting off-axis aberrations, it is even more desirable to dispose refracting optical elements which satisfy the following conditions (9) and (10) at both the pupil plane (E) and image plane (I) sides of the partial optical system 10, which comprises the semitransparent plane mirror 1 and the semitransparent curved mirror 2.

That is, it is important to satisfy the following conditions:

$$0.2 < f_2/f_1 < 1.2 \tag{9}$$

$$-0.16 < f_2/f_3 < 0.5 \tag{10}$$

where $f_1$ is the focal length of the refracting optical element with power which is cemented to the pupil plane (E) side of the partial optical system 10 having two semitransparent mirrors 1 and 2, $f_3$ is the focal length of the refracting optical element with power which is cemented to the image plane (I) side of the partial optical system 10, and $f_2$ is the focal length of the partial optical system 10.

The upper and lower limits of the above conditions (9) and (10) have been set for the same reasons as stated above for the condition (8).

It should be noted that refracting optical elements having power may be disposed at both the pupil plane (E) and image plane (I) sides of the partial optical system 10, which comprises the semitransparent plane mirror 1 and the semitransparent concave mirror 2, in such a manner that one of the refracting optical elements is cemented to the partial optical system 10, whereas the other refracting optical element is not cemented but disposed with an air spacing provided therebetween. In such a case, it is preferable that the refracting optical element which is cemented should satisfy the condition (9) or (10), and the refracting optical element which is not cemented should satisfy the condition (4) or (5).

To obtain an image of higher resolution, it is even more desirable that two semitransparent curved surfaces each having a concave surface directed toward the pupil plane should be used to constitute a partial optical system, that a refracting optical element having power should be disposed at the pupil plane or image plane side of the partial optical system, and further that the following conditions should be satisfied:

$$0 < f_2/f_1 < 0.42 \tag{11}$$

$$-0.4 < f_2/f_3 < 0.2 \tag{12}$$

where $f_1$ is the focal length of the refracting optical element with power which is disposed at the pupil plane side of the partial optical system comprising two semitransparent curved surfaces, $f_3$ is the focal length of the refracting optical element with power which is disposed at the image plane side of the partial optical system, and $f_2$ is the focal length of the partial optical system.

If the values of $f_2/f_1$ and $f_2/f_3$ in the conditions (11) and (12) are not smaller than the respective upper limits, i.e. 0.42 and 0.2, the refracting optical elements cannot satisfactorily correct negative field curvature produced in the partial optical system comprising two semitransparent concave mirrors. Consequently, negative field curvature becomes conspicuous on the image plane. Conversely, if the values of $f_2/f_1$ and $f_2/f_3$ in the conditions (11) and (12) are not larger than the respective lower limits, i.e. 0 and $-0.4$, the refracting optical elements cannot satisfactorily correct positive field curvature produced in the partial optical system comprising two semitransparent concave mirrors. Consequently, positive field curvature becomes conspicuous on the image plane.

To obtain an image of higher resolution at a wider field angle, it is even more desirable to dispose refracting optical elements which satisfy the following conditions (13) and (14) at both pupil plane and image plane sides of the partial optical system comprising two semitransparent concave mirrors. That is, it is important to satisfy the following conditions:

$$0 < f_2/f_1 < 1.0 \quad (13)$$

$$-1.2 < f_2/f_3 < 0 \quad (14)$$

where $f_1$ is the focal length of the refracting optical element with power which is disposed at the pupil plane side of the partial optical system comprising two semitransparent curved surface each having a concave surface directed toward the pupil plane, $f_3$ is the focal length of the refracting optical element with power which is disposed at the image plane side of the partial optical system, and $f_2$ is the focal length of the partial optical system.

If the values of $f_2/f_1$ and $f_2/f_3$ in the conditions (13) and (14) are not smaller than the respective upper limits, i.e. 1.0 and 0, the two refracting optical elements cannot satisfactorily correct negative field curvature produced in the partial optical system comprising two semitransparent concave mirrors. Consequently, negative field curvature becomes conspicuous on the image plane. Conversely, if the values of $f_2/f_1$ and $f_2/f_3$ in the conditions (13) and (14) are not larger than the respective lower limits, i.e. 0 and −1.2, the two refracting optical elements cannot satisfactorily correct positive field curvature produced in the partial optical system comprising two semitransparent concave mirrors. Consequently, positive field curvature becomes conspicuous on the image plane.

As has been described above, the refracting optical elements which are disposed at the pupil plane and image plane sides of the partial optical system comprising two semitransparent concave mirrors are assigned to establish conditions under which aberration correction can be made by only the partial optical system. To establish such conditions, it is important that no off-axis aberrations should be produced when the extra-axial ray bundle enters the pupil plane-side refracting optical element and when the extra-axial ray bundle emanates from the image plane-side refracting optical element. To meet the requirements, it is necessary to take into consideration the configuration of each refracting optical element which is to be disposed, and it is important that the refracting optical element which is disposed at the pupil plane side of the partial optical system should have a configuration close to a plano-convex lens, whereas the refracting optical element which is disposed at the image plane side of the partial optical system should have a configuration close to a convexo-plane lens. By forming the pupil plane-side surface of the pupil plane-side refracting optical element into a configuration close to a flat surface, the angle between the extra-axial ray bundle and the optical axis can be reduced to an extremely small angle with substantially no off-axis aberrations at the position where the extra-axial ray bundle is incident on the pupil plane-side surface. Further, by forming the pupil plane-side surface of the image plane-side refracting optical element into a configuration close to a flat surface, an extra-axial principal ray which reaches the image plane in approximately parallel to the optical axis enters the pupil plane-side surface of the image-plane side refracting optical element at an extremely small incident angle. Therefore, substantially no off-axis aberrations occur at that surface.

Even in a case where the refracting optical elements are not cemented to the partial optical system comprising two semitransparent concave mirrors, the above-described action can be obtained by making the curvature radii of those surfaces of the refracting optical elements which face the partial optical system approximately equal to the curvature radii of the pupil plane- and image plane-side surfaces of the partial optical system, and reducing the air spacing between each refracting optical element and the partial optical system. That is, by doing so, off-axis aberrations produced by the image plane-side surface of the pupil plane-side refracting optical element cancel those produced by the pupil plane-side surface of the partial optical system, and off-axis aberrations produced by the pupil plane-side surface of the image plane-side refracting optical element also cancel those produced by the image plane-side surface of the partial optical system.

Semitransparent surfaces used in the above partial optical system have a transmittance-to-reflectance ratio in the range of from 2:8 to 8:2.

Such semitransparent surfaces may be realized by any of the following methods: one in which the bundle of incident rays is divided in terms of area; another in which the bundle of incident rays is divided in terms of light intensity; and another in which the bundle of incident rays is divided in terms of both area and intensity.

FIG. 5 shows the method in which the quantity of incident light is divided in terms of area. Referring to FIG. 5, an aluminum coating 42 is provided on a transparent substrate 41 of glass or plastic material. The aluminum coating 42 is formed in a mesh-like pattern of about several μm to 0.1 mm, whereby a reflectance and a transmittance are set overall (macrocosmically) by the ratio of the area of the reflecting portions to the area of the transmitting portions.

FIG. 6 shows the method in which incident light is divided into transmitted light and reflected light in terms of light intensity. This method can be realized relatively easily and enables the desired semitransparent surface to be produced at low cost. As shown in FIG. 6, a semitransparent thin film 43 is coated on a transparent substrate 41 of glass or plastic material, thereby enabling the quantity of incident light to be divided. As the semitransparent thin film 43, a metallic thin film such as Al (aluminum), Cr (chromium), etc. is generally used. It is also common to employ a method in which a multiplicity of thin films of $SiO_2$, $MgF_2$, etc. are combined together as a dielectric multilayer film.

FIG. 7 shows a light quantity dividing method by polarization of light as another method of dividing incident light into transmitted light and reflected light in terms of light intensity. Referring to FIG. 7, a polarizing semitransparent thin film 44 is coated on a transparent substrate 41 of glass or plastic material to allow p- and s-polarized light components to be selectively transmitted or reflected, thereby dividing the quantity of incident light. Thus, a transmittance and a reflectance are set by the ratio of the p-polarized light component to the s-polarized light component in the incident light.

The above-described methods may be used in combination.

To cut off flare light that passes through at least two semitransparent surfaces of the partial optical system and reaches the image plane without being reflected by either of the two semitransparent surfaces, it is essential to use polarizing optical elements which utilize polarization of light. For example, a first polarizing plate and a first quarter-wave plate are disposed at the pupil plane side of the partial optical system to circularly polarize the incident light. In addition, a second quarter-wave plate is disposed between the first and second semitransparent surfaces, and a second polarizing plate is disposed in parallel Nicol relation to the first polarizing plate behind the second semitransparent surface. With this arrangement, normal rays which are reflected once by each of the first and second semitransparent surfaces pass through the second quarter-wave plate, which is disposed between the first and second semitransparent surfaces, three times. Thus, the normal rays pass through the first and second quarter-wave plates four times in total. Accordingly, the light passing through the first polarizing plate passes through the second polarizing plate, which is disposed in parallel Nicol relation to the first polarizing plate, without the plane of polarization being rotated. However, rays that pass through the first semitransparent surface without being reflected pass through the quarter-wave plates only twice in total. Therefore, the plane of polarization is rotated through 90°, and these rays are cut off by the second polarizing plate.

Thus, flare light can be cut off by using polarizing optical elements as described above. It should be noted that it is also possible to employ a polarizing optical element arrangement other than that described above, and that the above-described arrangement is merely an example.

The above-described optical system of the present invention can be used as an ocular optical system, which enables an object on the image plane or an aerial image to be observed as an enlarged image, by making the pupil plane coincident with the pupil of an observer's eyeball. The optical system can also be used as an imaging optical system, which forms a real image on the image plane, by allowing light rays from an object to enter the optical system from the pupil side.

Incidentally, it is possible to form a portable visual display apparatus, such as a stationary or head-mounted visual display apparatus, which enables the observer to see with both eyes, by preparing a combination of a two-dimensional image display device and an optical system according to the present invention, which is used as an ocular optical system, for each of the left and right eyes, and supporting the two combinations apart from each other by the interpupillary distance, that is, the distance between the eyes. FIG. 8 shows the whole arrangement of an example of such a portable visual display apparatus. A display apparatus body unit 50 contains a pair of left and right optical systems such as those described above as ocular optical systems. A pair of two-dimensional image display devices, which comprise liquid crystal display devices, are disposed on the image planes of the left and right optical systems, respectively. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g., a portable video cassette unit, through an image and sound transmitting cord 57. Therefore, the user can enjoy not only observing an image but also listening to sound with the reproducing unit 58 retained on a desired position, e.g., a belt, as illustrated in the figure. Reference numeral 59 in the figure denotes a switch and volume control part of the reproducing unit 58. It should be noted that the top frame 52 contains electronic parts such as image and sound processing circuits.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 19 is a view for explanation of the causes of field curvature and comatic aberration in the prior art.

DESCRIPTION OF THE PREFERRED EMBODIMENTS

Figure 1:
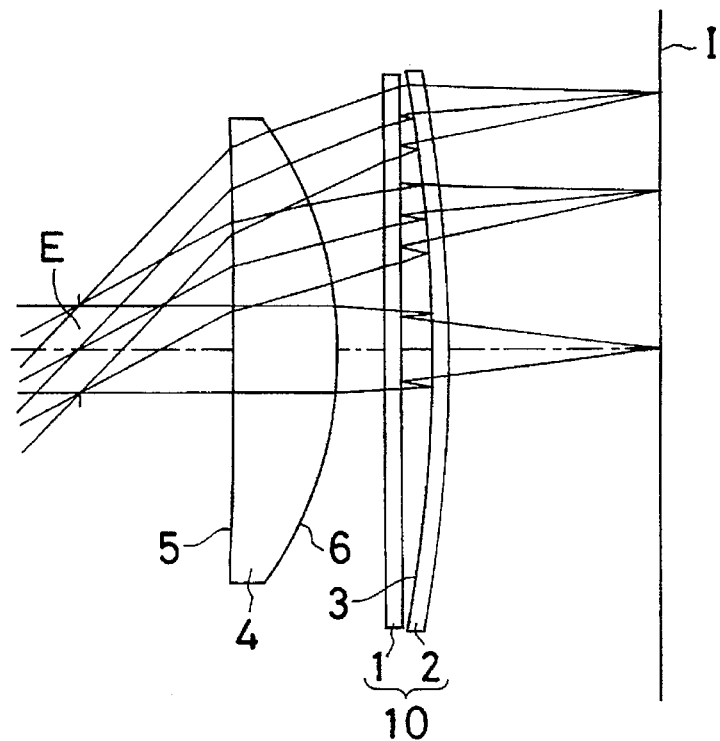
FIG. 1 is a sectional view showing a first basic arrangement of the optical system according to the present invention.
Figure 2:
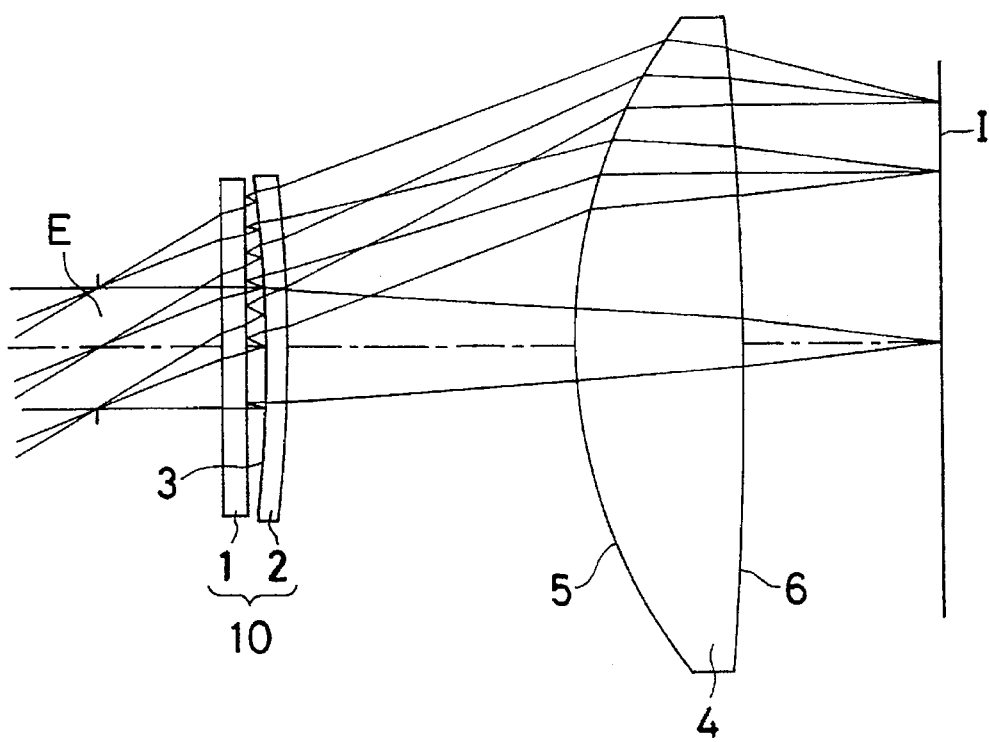
FIG. 2 is a sectional view showing a second basic arrangement of the optical system according to the present invention.
Figure 3:
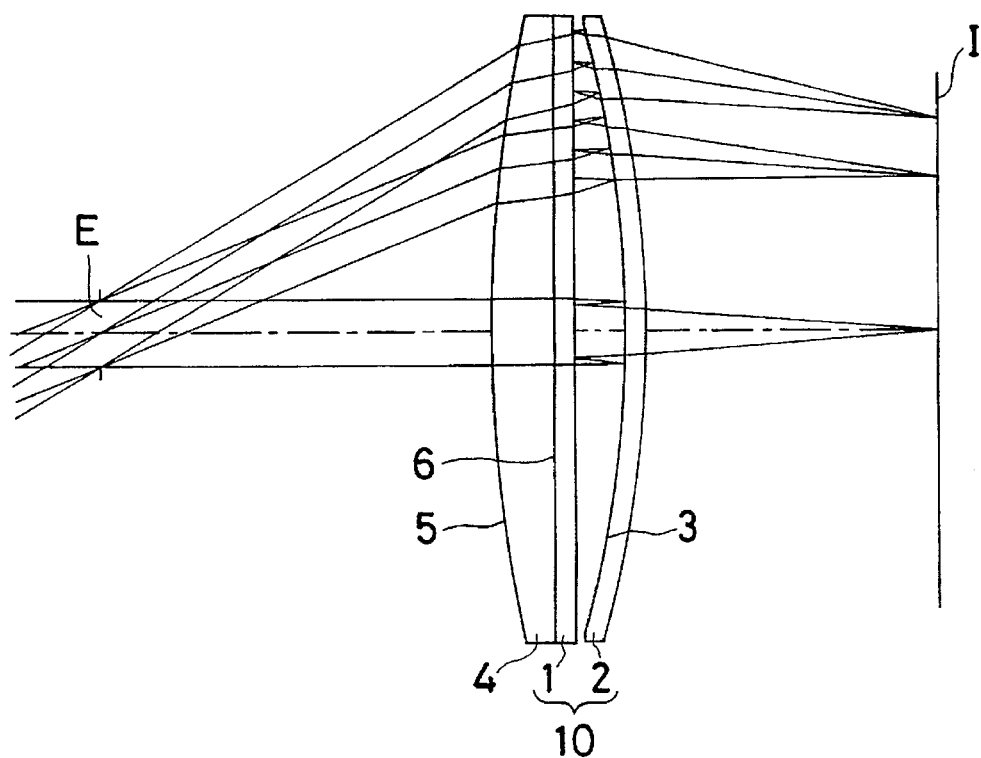
FIG. 3 is a sectional view showing a third basic arrangement of the optical system according to the present invention.
Figure 4:
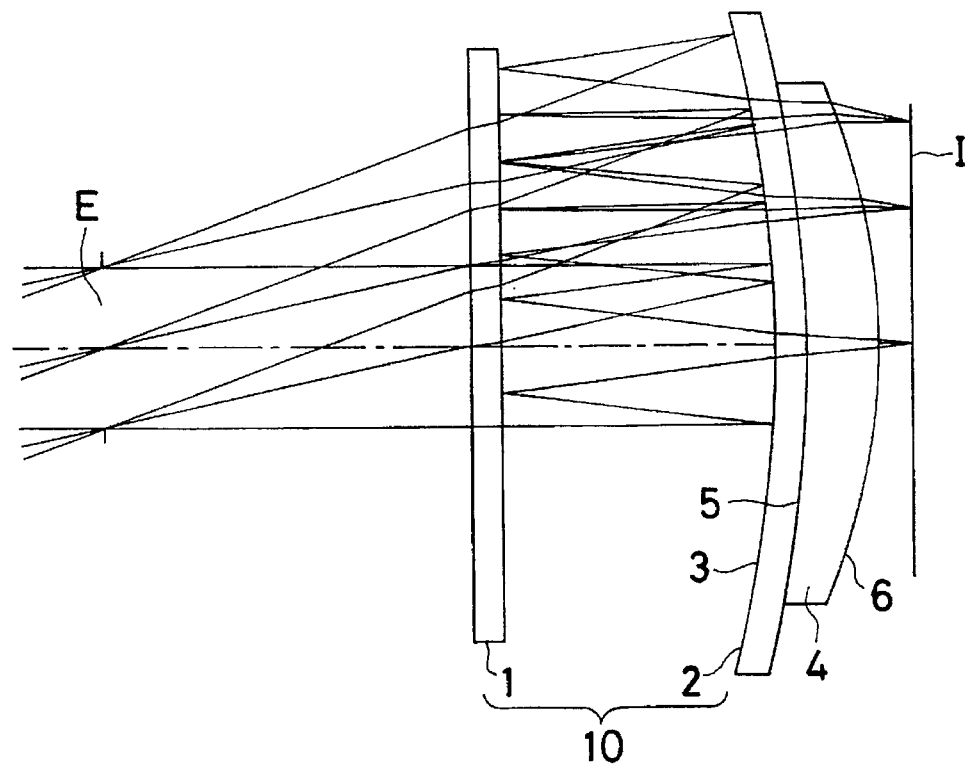
FIG. 4 is a sectional view showing a fourth basic arrangement of the optical system according to the present invention.
Figure 5:
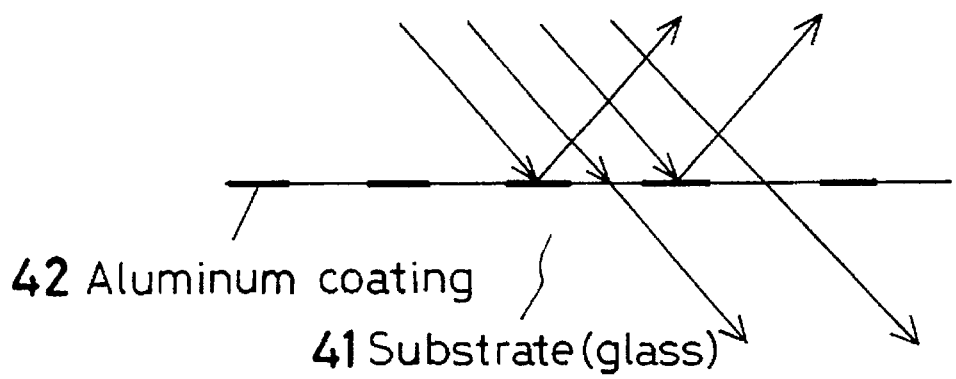
FIG. 5 shows the principle of a method for dividing the quantity of incident light in terms of area, which can be employed for semitransparent surfaces in the present invention.
Figure 6:
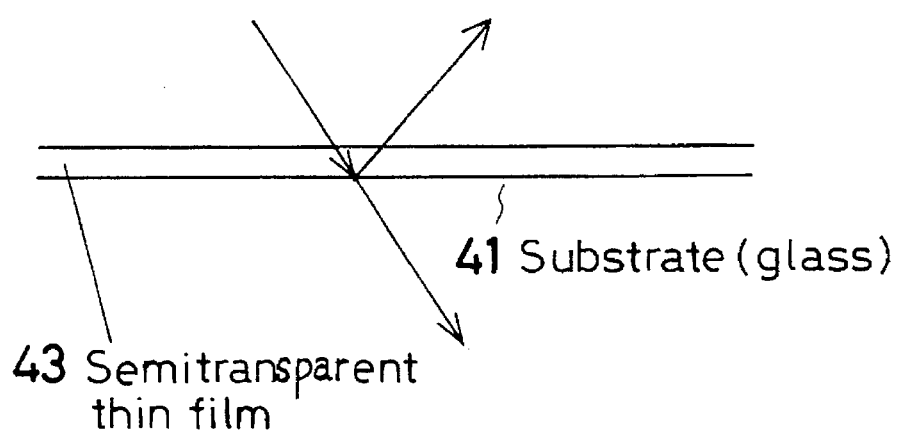
FIG. 6 shows the principle of a method for dividing the quantity of incident light in terms of light intensity, which can also be employed for semitransparent surfaces in the present invention.
Figure 7:
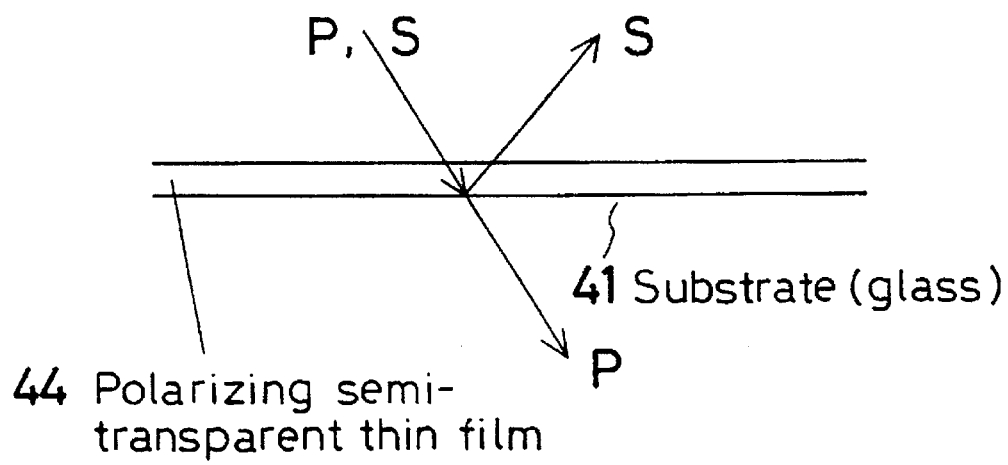
FIG. 7 shows the principle of a method for dividing the quantity of incident light by polarization of light, which can also be employed for semitransparent surfaces in the present invention.
Figure 8:
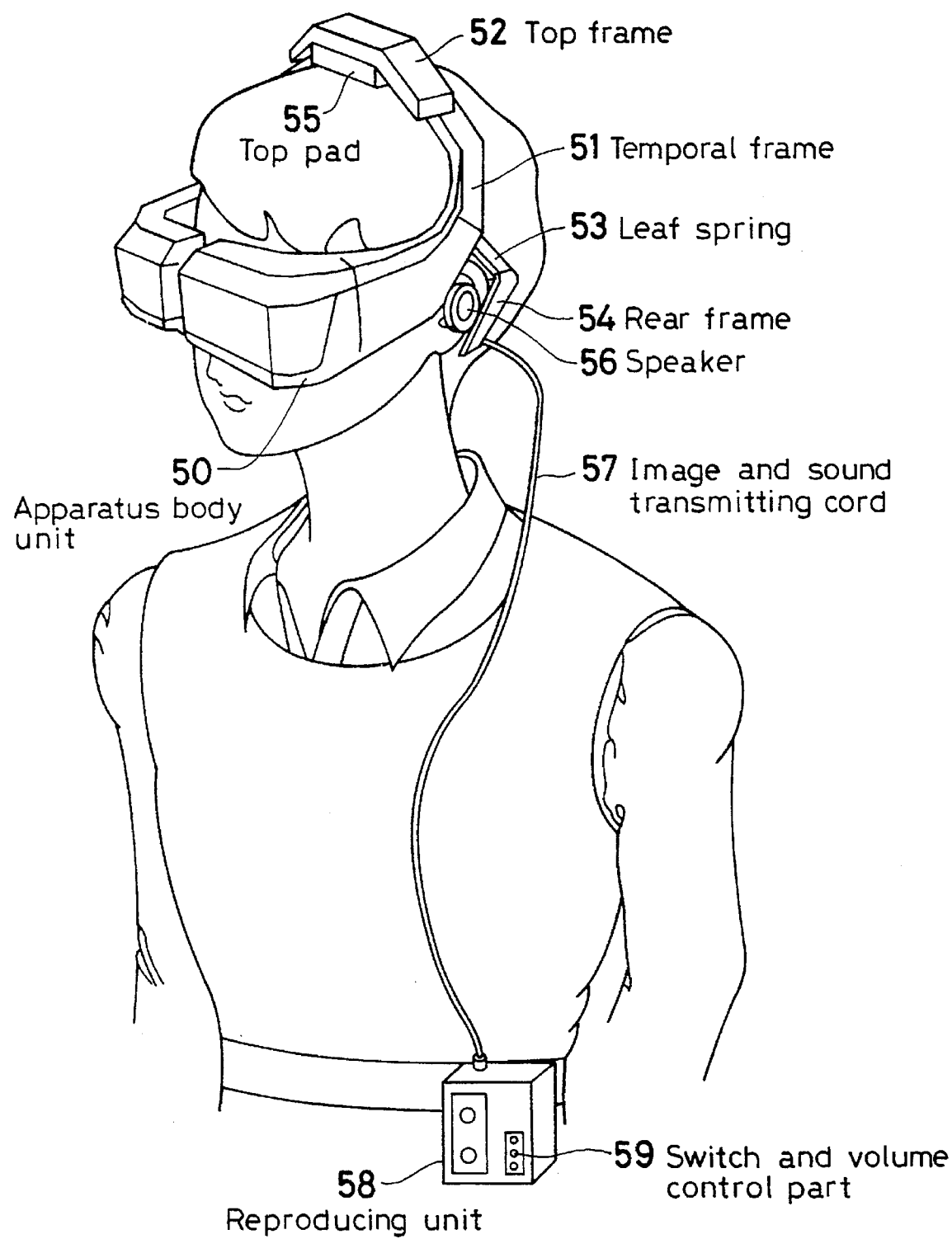
FIG. 8 shows the whole arrangement of an example of a portable visual display apparatus.

Examples 1 to 10 of the optical system according to the present invention will be described below.

FIGS. 9 to 18 are sectional views respectively showing optical systems in Examples 1 to 10. Numerical data in each Example will be shown later. In the figures, reference symbol E denotes a pupil position, and I an image plane. A partial optical system 12 comprises a first semitransparent surface 14 and a second semitransparent surface 15. A refracting optical element 11 having power is disposed at the pupil side of the partial optical system 12. A refracting optical element 13 having power is disposed at the image plane side of the partial optical system 12.

Figure 9:
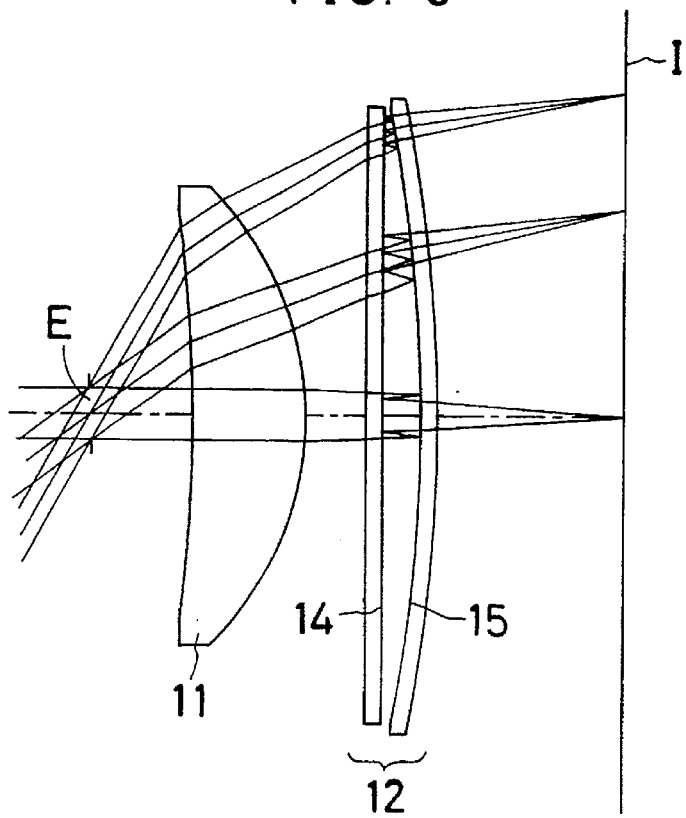
FIG. 9 is a sectional view of an optical system in Example 1 of the present invention.
Figure 10:
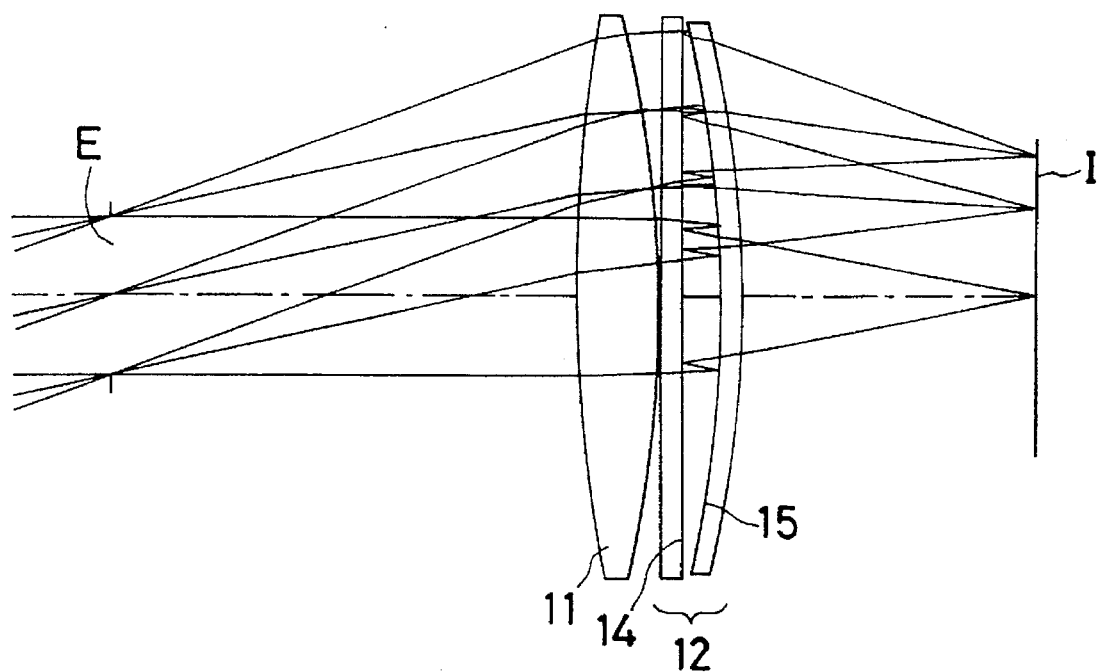
FIG. 10 is a sectional view of an optical system in Example 2 of the present invention.

In Example 1, as shown in FIG. 9, the first semitransparent surface 14 is a flat surface, and the second semitransparent surface 15 is a concave surface which is convex toward the image plane. A positive meniscus lens 11 which is convex toward the image plane is disposed at the pupil side of the partial optical system 12 without being cemented thereto. In this example, the field angle is 120°, the pupil diameter is 6 millimeters, the focal length is 40 millimeters, and F-number is 6.7. The value of $f_2/f_a$ in the condition (3) is 1.646. It should be noted that in the following numerical data, Surface Nos. are given to the surfaces in the order in which light rays pass through them, and that nd denotes the refractive index of each transparent material for the spectral d-line, and Vd denotes the Abbe's number (the same shall apply hereinafter). In Example 2, as shown in FIG. 10, the first semitransparent surface 14 is a flat surface, and the second semitransparent surface 15 is a concave surface which is convex toward the image plane. A biconvex lens 11 is disposed at the pupil side of the partial optical system 12 without being cemented thereto. In this example, the field angle is 40°, the pupil diameter is 15 millimeters, the focal length is 40 millimeters, and F-number is 2.7. The value of $f_2/f_a$ in the condition (3) is 0.748.

Figure 11:
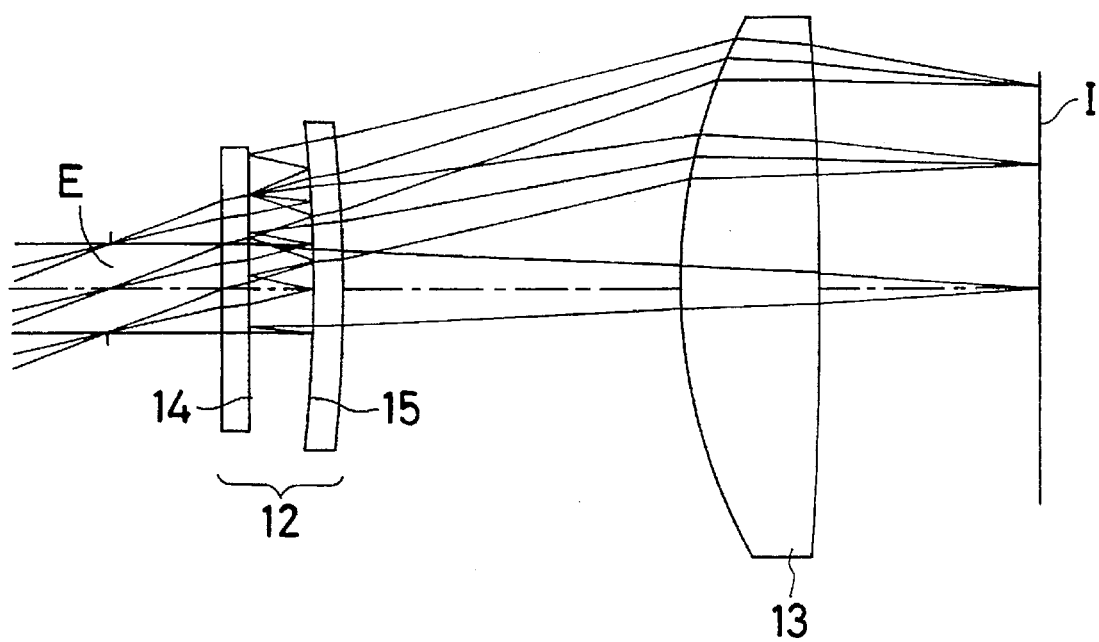
FIG. 11 is a sectional view of an optical system in Example 3 of the present invention.

In Example 3, as shown in FIG. 11, the first semitransparent surface 14 is a flat surface, and the second semitransparent surface 15 is a concave surface which is convex toward the image plane. A biconvex lens 13 is disposed at the image plane side of the partial optical system 12 without being cemented thereto. In this example, the field angle is 40°, the pupil diameter is 6 millimeters, the focal length is 40 millimeters, and F-number is 6.7. The value of $f_2/f_a$ in the condition (3) is 1.521.

Figure 12:
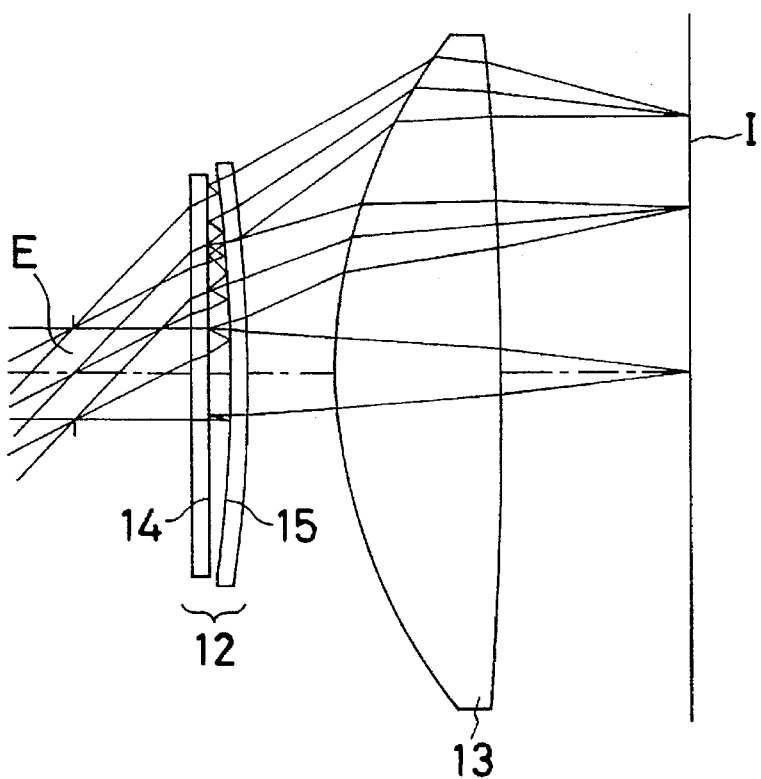
FIG. 12 is a sectional view of an optical system in Example 4 of the present invention.

In Example 4, as shown in FIG. 12, the first semitransparent surface 14 is a flat surface, and the second semitransparent surface 15 is a concave surface which is convex toward the image plane. A biconvex lens 13 is disposed at the image plane side of the partial optical system 12 without being cemented thereto. In this example, the field angle is 90°, the pupil diameter is 10 millimeters, the focal length is 40 millimeters, and F-number is 4.0. The value of $f_2/f_a$ in the condition (3) is 1.125.

Figure 13:
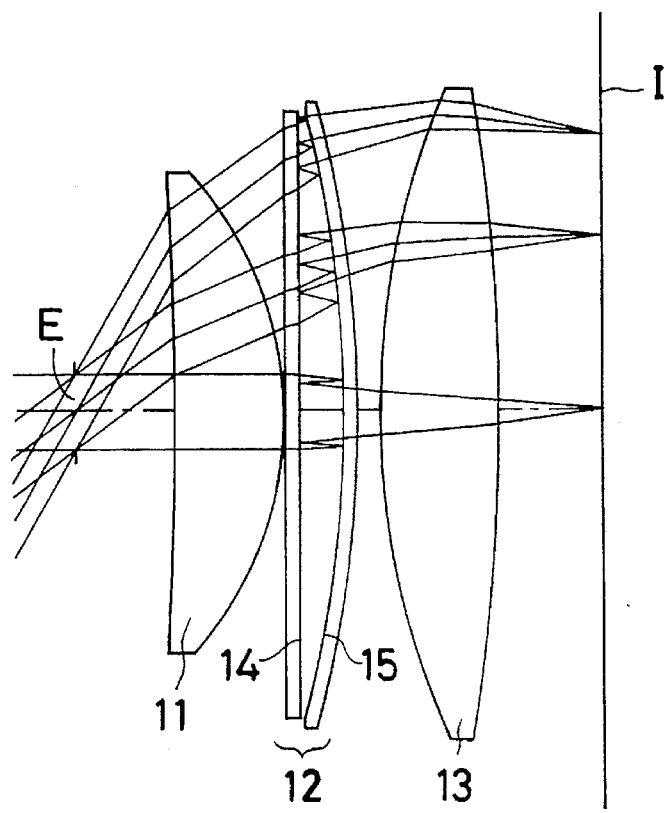
FIG. 13 is a sectional view of an optical system in Example 5 of the present invention.

In Example 5, as shown in FIG. 13, the first semitransparent surface 14 is a flat surface, and the second semitransparent surface 15 is a concave surface which is convex toward the image plane. A positive meniscus lens 11 which is convex toward the image plane is disposed at the pupil side of the partial optical system 12 without being cemented thereto, and further, a biconvex lens 13 is disposed at the image plane side of the partial optical system 12 without being cemented thereto. In this example, the field angle is 120°, the pupil diameter is 6 millimeters, the focal length is 40 millimeters, and F-number is 4.0. The value of $f_2/f_1$ in the condition (4) is 0.834, and the value of $f_2/f_3$ in the condition (5) is 0.667.

Figure 14:
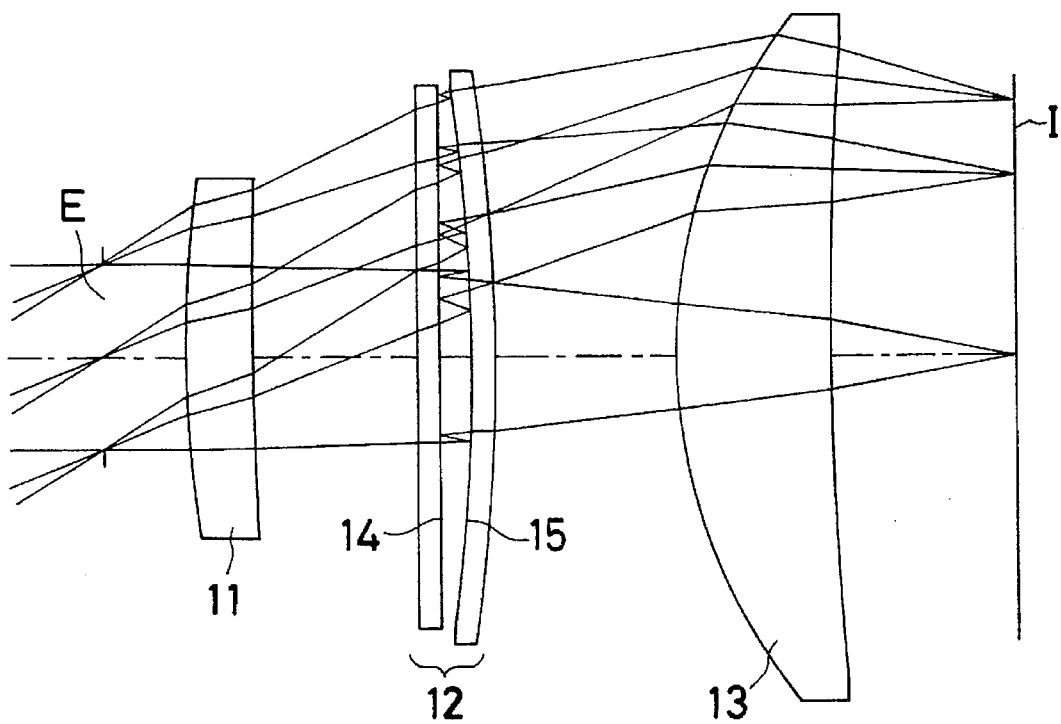
FIG. 14 is a sectional view of an optical system in Example 6 of the present invention.

In Example 6, as shown in FIG. 14, the first semitransparent surface 14 is a flat surface, and the second semitransparent surface 15 is a concave surface which is convex toward the image plane. A positive meniscus lens 11 which is convex toward the pupil is disposed at the pupil side of the partial optical system 12 without being cemented thereto, and further, a positive meniscus lens 13 which is convex toward the pupil is disposed at the image plane side of the partial optical system 12 without being cemented thereto. In this example, the field angle is 60°, the pupil diameter is 15 millimeters, the focal length is 40 millimeters, and F-number is 2.7. The value of $f_2/f_1$ in the condition (4) is 0.294, and the value of $f_2/f_3$ in the condition (5) is 1.122.

Figure 15:
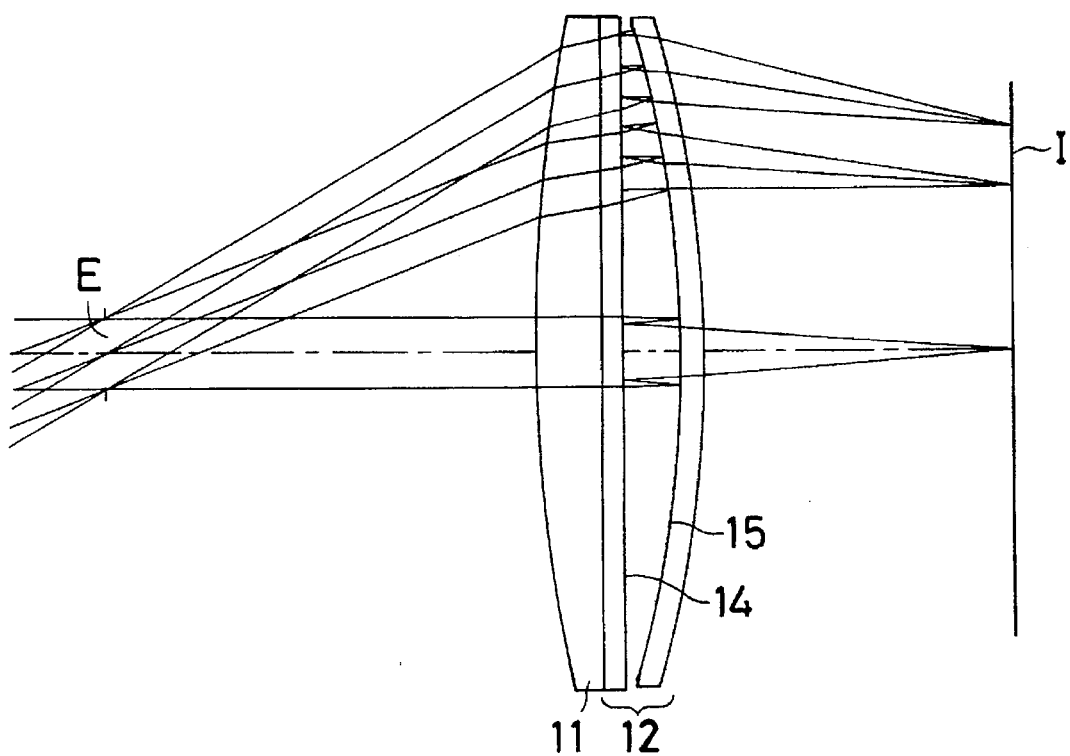
FIG. 15 is a sectional view of an optical system in Example 7 of the present invention.

In Example 7, as shown in FIG. 15, the first semitransparent surface 14 is a flat surface, and the second semitransparent surface 15 is a concave surface which is convex toward the image plane. A convexo-plane lens 11 is cemented to the pupil side of the partial optical system 12. In this example, the field angle is 60°, the pupil diameter is 6 millimeters, the focal length is 40 millimeters, and F-number is 6.7. The value of $f_2/f_a$ in the condition (8) is 0.258.

Figure 16:
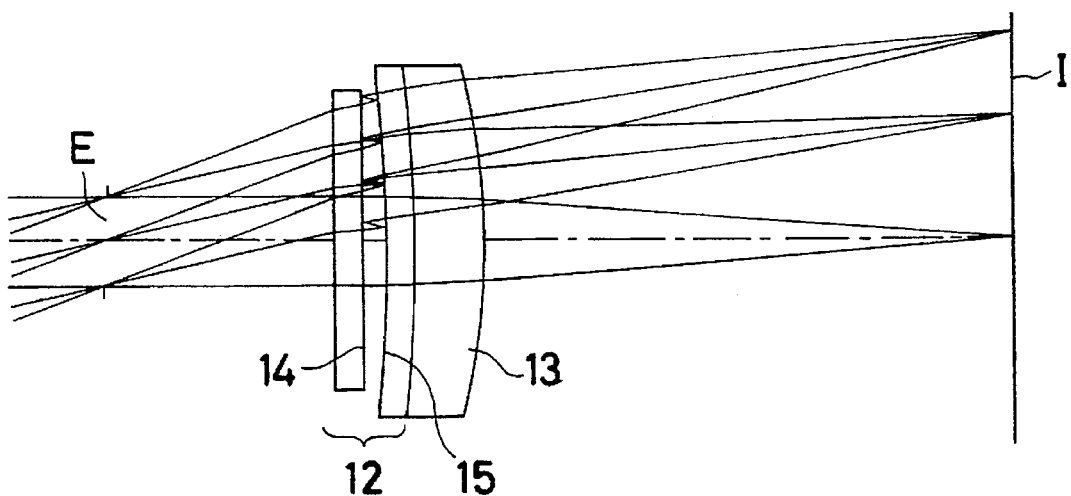
FIG. 16 is a sectional view of an optical system in Example 8 of the present invention.

In Example 8, as shown in FIG. 16, the first semitransparent surface 14 is a flat surface, and the second semitransparent surface 15 is a concave surface which is convex toward the image plane. A positive meniscus lens 13 which is convex toward the image plane is cemented to the image plane side of the partial optical system 12. In this example, the field angle is 40°, the pupil diameter is 6 millimeters, the focal length is 40 millimeters, and F-number is 6.7. The value of $f/f_3$ in the condition (7) is 0.386, and the value of $f_2/f_a$ in the condition (8) is 0.580.

Figure 17:
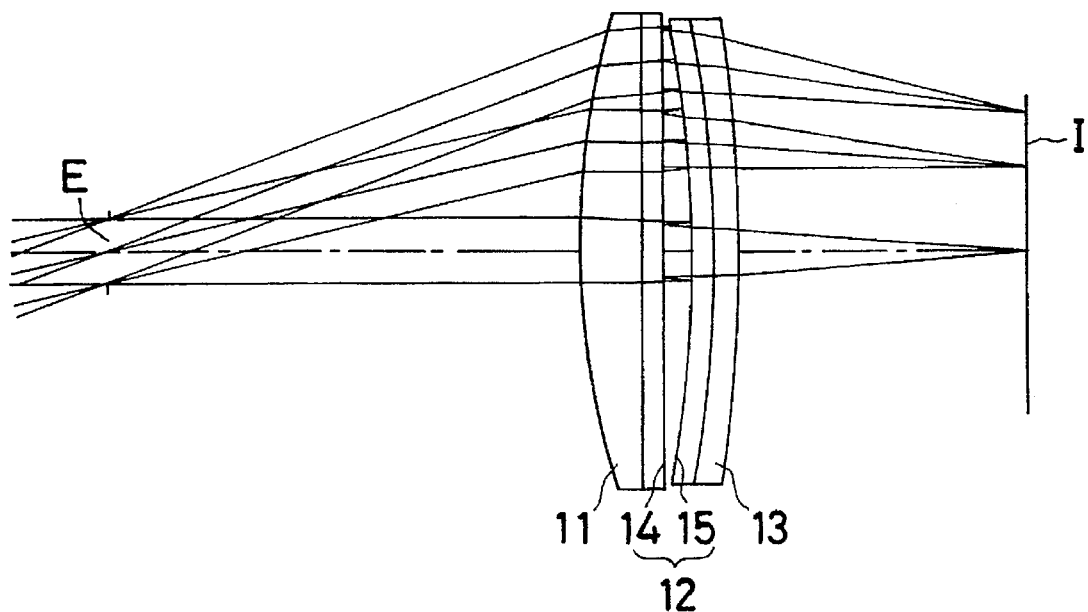
FIG. 17 is a sectional view of an optical system in Example 9 of the present invention.

In Example 9, as shown in FIG. 17, the first semitransparent surface 14 is a flat surface, and the second semitransparent surface 15 is a concave surface which is convex toward the image plane. A convexo-plane lens 11 is cemented to the pupil side of the partial optical system 12, and further, a negative meniscus lens 13 which is convex toward the image plane is cemented to the image plane side of the partial optical system 12. In this example, the field angle is 40°, the pupil diameter is 6 millimeters, the focal length is 40 millimeters, and F-number is 6.7. The value of $f/f_3$ in the condition (7) is −0.042, the value of $f_2/f_1$ in the condition (9) is 0.554, and the value of $f_2/f_3$ in the condition (10) is −0.060.

Figure 18:
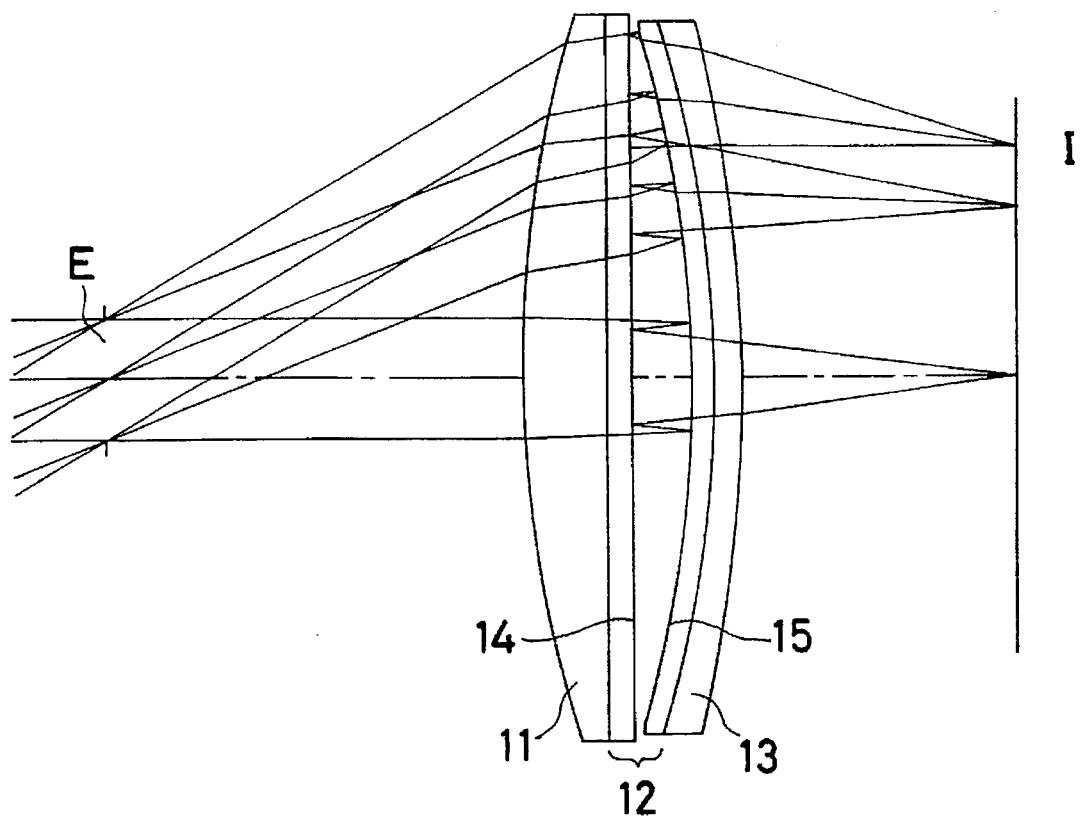
FIG. 18 is a sectional view of an optical system in Example 10 of the present invention.

In Example 10, as shown in FIG. 18, the first semitransparent surface 14 is a flat surface, and the second semitransparent surface 15 is a concave surface which is convex toward the image plane. A convexo-plane lens 11 is cemented to the pupil side of the partial optical system 12, and further, a negative meniscus lens 13 which is convex toward the image plane is cemented to the image plane side of the partial optical system 12. In this example, the field angle is 60°, the pupil diameter is 10 millimeters, the focal length is 40 millimeters, and F-number is 4.0. The value of $f/f_3$ in the condition (7) is −0.023, the value of $f_2/f_1$ in the condition (9) is 0.404, and the value of $f_2/f_3$ in the condition (10) is −0.030.

Numerical data in the above Examples 1 to 10 will be shown below:

| Surface No. | Radius of curvature | Surface separation | Refractive index | Abbe's No. |
|---|---|---|---|---|
| | | Example 1 | | |
| 1 | (pupil position E) | 11.820 | | |
| 2 | −309.8986 | 14.236 | 1.6970 | 48.9 |
| 3 | −37.1617 | 7.603 | | |
| 4 | ∞ | 2.000 | 1.7535 | 27.6 |
| 5 | ∞ | 4.196 | | |
| 6 | −194.7236 | −4.196 | | |
| | (reflective surface 15) | | | |
| 7 | ∞ | 4.196 | | |
| | (reflective surface 14) | | | |
| 8 | −194.7236 | 2.000 | 1.5578 | 60.5 |
| 9 | −194.7236 | 22.403 | | |
| 10 | (image plane I) | | | |
| | | Example 2 | | |
| 1 | (pupil position E) | 46.154 | | |
| 2 | 162.2238 | 7.833 | 1.7550 | 27.6 |
| 3 | −113.0114 | 0.100 | | |
| 4 | ∞ | 2.000 | 1.7550 | 27.6 |
| 5 | ∞ | 3.488 | | |
| 6 | −133.0817 | −3.488 | | |
| | (reflective surface 15) | | | |
| 7 | ∞ | 3.488 | | |
| | (reflective surface 14) | | | |
| 8 | −133.0817 | 2.000 | 1.5433 | 57.6 |
| 9 | −133.0817 | 28.899 | | |
| 10 | (image plane I) | | | |
| | | Example 3 | | |
| 1 | (pupil position E) | 8.000 | | |
| 2 | ∞ | 2.000 | 1.7315 | 28.6 |
| 3 | ∞ | 4.477 | | |
| 4 | −140.8543 | −4.477 | | |
| | (reflective surface 15) | | | |
| 5 | ∞ | 4.477 | | |
| | (reflective surface 14) | | | |
| 6 | −140.8543 | 2.000 | 1.5710 | 42.8 |
| 7 | −140.8543 | 24.438 | | |
| 8 | 38.6309 | 9.506 | 1.7434 | 44.7 |
| 9 | −292.4708 | 15.303 | | |
| 10 | (image plane I) | | | |
| | | Example 4 | | |
| 1 | (pupil position E) | 13.562 | | |
| 2 | ∞ | 2.000 | 1.7550 | 27.6 |
| 3 | ∞ | 2.406 | | |
| 4 | −148.2359 | −2.406 | | |
| | (reflective surface 15) | | | |
| 5 | ∞ | 2.406 | | |
| | (reflective surface 14) | | | |
| 6 | −148.2359 | 2.000 | 1.4870 | 70.4 |
| 7 | −148.2359 | 10.071 | | |
| 8 | 57.1763 | 19.262 | 1.7550 | 27.6 |
| 9 | −335.3215 | 20.967 | | |
| 10 | (image plane I) | | | |
| | | Example 5 | | |
| 1 | (pupil position E) | 13.075 | | |
| 2 | −1753.4860 | 16.015 | 1.4870 | 70.3 |
| 3 | −48.2219 | 0.100 | | |
| 4 | ∞ | 2.000 | 1.7550 | 27.6 |
| 5 | ∞ | 5.811 | | |
| 6 | −168.8179 | −5.811 | | |
| | (reflective surface 15) | | | |
| 7 | ∞ | 5.811 | | |
| | (reflective surface 14) | | | |
| 8 | −168.8179 | 2.000 | 1.6437 | 45.5 |
| 9 | −168.8179 | 3.883 | | |
| 10 | 118.0595 | 15.943 | 1.6758 | 31.7 |
| 11 | −297.7776 | 14.287 | | |
| 12 | (image plane I) | | | |

| Surface No. | Radius of curvature | Surface separation | Refractive index | Abbe's No. |
|---|---|---|---|---|
| | | Example 6 | | |
| 1 | (pupil position E) | 7.261 | | |
| 2 | 99.7846 | 5.532 | 1.5026 | 68.7 |
| 3 | 448.5259 | 13.590 | | |
| 4 | ∞ | 2.000 | 1.6589 | 43.4 |
| 5 | ∞ | 2.539 | | |
| 6 | −148.6900 | −2.539 | | |
| | (reflective surface 15) | | | |
| 7 | ∞ | 2.539 | | |
| | (reflective surface 14) | | | |
| 8 | −148.6900 | 2.000 | 1.7264 | 32.5 |
| 9 | −148.6900 | 15.166 | | |
| 10 | 44.6865 | 12.772 | 1.7550 | 27.6 |
| 11 | 357.0748 | 15.355 | | |
| 12 | (image plane I) | | | |
| | | Example 7 | | |
| 1 | (pupil position E) | 37.135 | | |
| 2 | 122.7345 | 5.797 | 1.7550 | 27.6 |
| 3 | ∞ | 2.000 | 1.7550 | 27.6 |
| 4 | ∞ | 4.823 | | |
| 5 | −99.3061 | −4.823 | | |
| | (reflective surface 15) | | | |
| 6 | ∞ | 4.823 | | |
| | (reflective surface 14) | | | |
| 7 | −99.3061 | 2.000 | 1.4870 | 70.4 |
| 8 | −99.3061 | 26.849 | | |
| 9 | (image plane I) | | | |
| | | Example 8 | | |
| 1 | (pupil position E) | 16.157 | | |
| 2 | ∞ | 2.000 | 1.7550 | 27.6 |
| 3 | ∞ | 1.389 | | |
| 4 | −119.5460 | −1.389 | | |
| | (reflective surface 15) | | | |
| 5 | ∞ | 1.389 | | |
| | (reflective surface 14) | | | |
| 6 | −119.5460 | 2.000 | 1.7550 | 27.6 |
| 7 | −119.5460 | 5.000 | 1.7550 | 27.6 |
| 8 | −48.1145 | 36.431 | | |
| 9 | (image plane I) | | | |
| | | Example 9 | | |
| 1 | (pupil position E) | 46.525 | | |
| 2 | 77.5886 | 5.892 | 1.7550 | 27.6 |
| 3 | ∞ | 2.000 | 1.7550 | 27.6 |
| 4 | ∞ | 3.040 | | |
| 5 | −113.5400 | −3.040 | | |
| | (reflective surface 15) | | | |
| 6 | ∞ | 3.040 | | |
| | (reflective surface 14) | | | |
| 7 | −113.5400 | 2.000 | 1.4870 | 70.4 |
| 8 | −113.5400 | 2.500 | 1.5136 | 61.8 |
| 9 | −148.9844 | 28.012 | | |
| 10 | (image plane I) | | | |
| | | Example 10 | | |
| 1 | (pupil position E) | 35.683 | | |
| 2 | 96.6073 | 7.145 | 1.7550 | 27.6 |
| 3 | ∞ | 2.000 | 1.7550 | 27.6 |
| 4 | ∞ | 5.145 | | |
| 5 | −102.9215 | −5.145 | | |
| | (reflective surface 15) | | | |
| 6 | ∞ | 5.145 | | |
| | (reflective surface 14) | | | |
| 7 | −102.9215 | 2.000 | 1.4870 | 70.4 |
| 8 | −102.9215 | 2.402 | 1.4870 | 70.4 |
| 9 | −118.1407 | 23.521 | | |
| 10 | (image plane I) | | | |

Tables 1 and 2 below show the values of $f_1$, $1/R_1$, $1/R_2$, $1/R_{21}$, $1/R_{22}$, $f_2$, $f_3$, $f_2/f_1$, and $f_2/f_3$ in the above Examples 1 to 10, where $f_1$ is the focal length of the lens 11, $f_2$ is the focal length of the partial optical system 12, $f_3$ is the focal length of the lens 13, $R_{11}$ is the curvature radius of the surface of the lens 11 which is closer to the pupil plane E, $R_{12}$ is the curvature radius of the surface of the lens 11 which is closer to the image plane I, $R_{21}$ is the curvature radius of the surface of the lens 13 which is closer to the pupil plane E, and $R_{22}$ is the curvature radius of the surface of the lens 13 which is closer to the image plane I.

TABLE 1

|  | $f_1$ | $1/R_{11}$ | $1/R_{12}$ | $1/R_{21}$ | $1/R_{22}$ |
| --- | --- | --- | --- | --- | --- |
| Example 1 | 59.30 | −0.00323 | −0.02691 |  |  |
| Example 2 | 89.30 | 0.00616 | −0.00885 |  |  |
| Example 3 |  |  |  | 0.02589 | −0.00342 |
| Example 4 |  |  |  | 0.01749 | −0.00298 |
| Example 5 | 101.49 | −0.00057 | −0.02074 | 0.00847 | −0.00336 |
| Example 6 | 253.95 | 0.01002 | 0.00223 | 0.02238 | 0.00280 |
| Example 7 | 162.56 | 0.00815 | 0.00000 |  |  |
| Example 8 |  |  |  | −0.00836 | −0.02078 |
| Example 9 | 102.77 | 0.01289 | 0.00000 | −0.00881 | −0.00671 |
| Example 10 | 127.96 | 0.01035 | 0.00000 | −0.00972 | −0.00846 |

TABLE 2

|  | $f_2$ | $f_3$ | $f_2/f_1$ | $f_2/f_3$ |
| --- | --- | --- | --- | --- |
| Example 1 | 97.62 |  | 1.64621 |  |
| Example 2 | 66.81 |  | 0.74815 |  |
| Example 3 | 70.70 | 46.47 |  | 1.52141 |
| Example 4 | 74.37 | 66.09 |  | 1.12528 |
| Example 5 | 84.69 | 127.05 | 0.83447 | 0.66659 |
| Example 6 | 74.62 | 66.48 | 0.29384 | 1.12244 |
| Example 7 | 49.92 |  | 0.30709 |  |
| Example 8 | 60.05 | 103.53 |  | 0.58002 |
| Example 9 | 57.03 | −951.94 | 0.55492 | −0.05991 |
| Example 10 | 51.73 | −1729.96 | 0.40425 | −0.02990 |

As will be clear from the foregoing description, the present invention provides an optical system which is usable as either an ocular optical system or an imaging optical system, and which is satisfactorily corrected for both field curvature and comatic aberration for a field angle of up to about 120° and for a pupil diameter of up to about 15 millimeters. It is also possible to provide a head-mounted visual display apparatus which uses the above-described optical system as an ocular optical system, and which enables observation of an image that is clear as far as the edges of visual field at a wide field angle.

What we claim is:

1. An optical system comprising:
a partial optical system having at least two semitransparent surfaces which are disposed so that each semitransparent surface transmits light rays at least once and reflects them at least once;
a refracting optical element having refractive power; and
wherein a semitransparent surface of said partial optical system which is closer to a pupil plane is a flat surface, and a semitransparent surface of said partial optical system which is closer to an image plane is a concave surface, and wherein said refracting optical element is disposed at the pupil plane or image plane side of said partial optical system with an air spacing provided therebetween, said refracting optical element having a focal length which satisfies the following condition:

$$f_a > 0$$

where $f_a$ is a focal length of said refracting optical element.

2. An optical system according to claim 1, wherein said refracting optical element satisfies the following condition:

$$1/R_1 > 1/R_2 \qquad (2)$$

where $R_1$ is a curvature radius of a surface of said refracting optical element which is closer to the pupil plane, and $R_2$ is a curvature radius of a surface of said refracting optical element which is closer to the image plane.

3. An optical system according to claim 2, which satisfies the following condition:

$$0.35 < f_2/f_a < 3.4 \qquad (3)$$

where $f_a$ is a focal length of said refracting optical element, and $f_2$ is a focal length of said partial optical system.

4. An optical system according to claim 1, wherein a pair of said refracting optical elements are disposed at the pupil plane and image plane sides, respectively, of said partial optical system with an air spacing provided between each refracting optical element and said partial optical system, and wherein the following conditions are satisfied:

$$0.1 < f_2/f_1 < 1.8 \qquad (4)$$

$$0.3 < f_2/f_3 < 2.4 \qquad (5)$$

where $f_1$ is a focal length of the refracting optical element disposed at the pupil plane side of said partial optical system with an air spacing provided therebetween, $f_3$ is a focal length of the refracting optical element disposed at the image plane side of said partial optical system with an air spacing provided therebetween, and $f_2$ is a focal length of said partial optical system.

5. An optical system comprising:
a partial optical system having at least two semitransparent surfaces which are disposed so that each semitransparent surface transmits light rays at least once and reflects them at least once;
a refracting optical element having refractive power; and
wherein said refracting optical element having refractive power is cemented to a side of said partial optical system which is closer to a pupil plane or an image plane, and wherein the following condition is satisfied:

$$0.1 < f_2/f_a < 3$$

where $f_a$ is a focal length of said refracting optical element, and $f_2$ is a focal length of said partial optical system.

6. An optical system according to claim 5, wherein said refracting optical element which is cemented to the pupil plane side of said partial optical system has a focal length which satisfies the following condition:

$$f_1 > 0 \qquad (6)$$

where $f_1$ is a focal length of said refracting optical element.

7. An optical system according to claim 5, wherein a pair of said refracting optical elements are cemented to the pupil plane and image plane sides, respectively, of said partial optical system, and wherein the following conditions are satisfied:

$$0.2 < f_2/f_1 < 1.2 \quad (9)$$

$$-0.16 < f_2/f_3 < 0.5 \quad (10)$$

where $f_1$ is a focal length of the refracting optical element which is cemented to the pupil plane side of said partial optical system, $f_3$ is a focal length of the refracting optical element which is cemented to the image plane side of said partial optical system, and $f_2$ is a focal length of said partial optical system.

8. An optical system according to claim 1 or 5, wherein said semitransparent surfaces of said partial optical system having a transmittance in a range of from 20% to 80%.

9. An optical system according to claim 1 or 5, further comprising:

means for cutting off light rays passing through said at least two semitransparent surfaces of said partial optical system without being reflected by either of them, said cut-off means including a polarizing optical element, and said cut-off means being disposed in an optical path.

10. An optical system according to claim 1 or 5, which is used as an ocular optical system.

11. An optical system according to claim 1 or 5, which is used as an ocular optical system.

* * * * *